(12) United States Patent
Brueck et al.

(10) Patent No.: US 9,217,346 B2
(45) Date of Patent: Dec. 22, 2015

(54) METHOD FOR OPERATING AN EXHAUST GAS SYSTEM, METHOD FOR OPERATING A MOTOR VEHICLE AND MOTOR VEHICLE HAVING THE SYSTEM

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Joerg-Roman Konieczny, Much (DE)

(73) Assignee: EMITEC GESELLSCHAFT FUER EMISSIONSTECHNOLOGIE MBH, Lohmar (DE)

( * ) Notice: Subject to any disclaimer, the term of this patent is extended or adjusted under 35 U.S.C. 154(b) by 0 days.

(21) Appl. No.: 13/952,823

(22) Filed: Jul. 29, 2013

(65) Prior Publication Data

US 2013/0305691 A1 Nov. 21, 2013

Related U.S. Application Data

(63) Continuation of application No. PCT/EP2012/050465, filed on Jan. 12, 2012.

(30) Foreign Application Priority Data

Jan. 28, 2011 (DE) .......................... 10 2011 009 619

(51) Int. Cl.
*F01N 3/00* (2006.01)
*F01N 3/02* (2006.01)
*F01N 3/10* (2006.01)
(Continued)

(52) U.S. Cl.
CPC ................ *F01N 3/08* (2013.01); *F01N 3/0807* (2013.01); *F01N 3/0835* (2013.01); *F01N 3/2013* (2013.01); *F01N 9/00* (2013.01); *F01N 2240/16* (2013.01); *F01N 2550/02* (2013.01); *F01N 2900/102* (2013.01); *Y02T 10/26* (2013.01); *Y02T 10/47* (2013.01)

(58) Field of Classification Search
USPC ................................... 60/286, 295, 299–301
See application file for complete search history.

(56) References Cited

U.S. PATENT DOCUMENTS

| 5,271,906 A | 12/1993 | Yuuki et al. |
| 5,634,331 A | 6/1997 | Aoki et al. |

(Continued)

FOREIGN PATENT DOCUMENTS

| DE | 4236271 A1 | 4/1993 |
| DE | 10323979 A1 | 12/2004 |
| EP | 1057983 A1 | 12/2000 |

OTHER PUBLICATIONS

International Search Report of PCT/EP2012/050465, Dated May 18, 2012.

*Primary Examiner* — Jorge Pereiro
*Assistant Examiner* — Dapinder Singh
(74) *Attorney, Agent, or Firm* — Laurence Greenberg; Werner Stemer; Ralph Locher

(57) ABSTRACT

A method for operating an exhaust gas system of an internal combustion engine having at least one adsorber for the adsorption of hydrocarbons, a catalytic converter disposed downstream of the adsorber for converting hydrocarbons and at least one heating device disposed between the adsorber and the catalytic converter, includes adapting operation of the heating device in dependence on a state of aging of the catalytic converter. A method for operating a motor vehicle and a motor vehicle having the system are also provided.

20 Claims, 2 Drawing Sheets

(51) Int. Cl.
  *F01N 3/20*   (2006.01)
  *F01N 3/08*   (2006.01)
  *F01N 9/00*   (2006.01)

(56) References Cited

U.S. PATENT DOCUMENTS

| | | | |
|---|---|---|---|
| 5,713,198 A | 2/1998 | Aoki et al. | |
| 5,738,832 A * | 4/1998 | Dogahara et al. | 422/171 |
| 5,804,148 A | 9/1998 | Kanesaka et al. | |
| 6,167,696 B1 * | 1/2001 | Maaseidvaag et al. | 60/274 |
| 6,170,260 B1 * | 1/2001 | Ishii et al. | 60/297 |
| 6,354,076 B1 * | 3/2002 | Yasui et al. | 60/274 |
| 6,370,872 B1 * | 4/2002 | Watanabe et al. | 60/288 |
| 6,401,450 B1 * | 6/2002 | Hoshi | 60/277 |
| 6,742,329 B2 * | 6/2004 | Miura et al. | 60/285 |

\* cited by examiner

US 9,217,346 B2

METHOD FOR OPERATING AN EXHAUST GAS SYSTEM, METHOD FOR OPERATING A MOTOR VEHICLE AND MOTOR VEHICLE HAVING THE SYSTEM

CROSS-REFERENCE TO RELATED APPLICATION

This is a continuation application, under 35 U.S.C. §120, of copending International Application No. PCT/EP2012/050465, filed Jan. 12, 2012, which designated the United States; this application also claims the priority, under 35 U.S.C. §119, of German Patent Application DE 10 2011 009 619.1, filed Jan. 28, 2011; the prior applications are herewith incorporated by reference in their entirety.

BACKGROUND OF THE INVENTION

Field of the Invention

The invention relates to a method for operating an exhaust gas system of an internal combustion engine which is intended to reduce pollutant emissions of the internal combustion engine, especially after cold starting. The invention also relates to a method for operating a motor vehicle and a motor vehicle having the system.

In recent years, exhaust gas regulations for internal combustion engines have become ever stricter. That also applies especially to the cold starting behavior of internal combustion engines, i.e. the time period immediately after the initial starting of the internal combustion engine of a motor vehicle. It is particularly in that combustion process that increased amounts of hydrocarbons are discharged through the exhaust line to the environment without being burned. For a number of years, therefore, exhaust gas treatment devices including an adsorber and a catalytic converter have been installed in exhaust gas systems for corresponding internal combustion engines. The adsorber is used to adsorb hydrocarbons, but that adsorption is possible only up to a particular temperature (about 150° C.). When that temperature is reached, desorption of the hydrocarbons from the adsorber begins, and therefore those hydrocarbons are fed back into the exhaust gas flow. The hydrocarbons emerging from the combustion chamber of the internal combustion engine without being burned and/or the hydrocarbons desorbed by the adsorber are then supposed to be converted by using a substance with an oxidizing action in the catalytic converter disposed downstream of the adsorber. The catalytic converter has a "light-off temperature" and it is only when that temperature is reached that the hydrocarbons are converted catalytically by the catalytic converter.

In constructing exhaust gas treatment devices of that kind it is necessary to match the adsorption behavior of the adsorber and the conversion behavior of the catalytic converter disposed downstream to one another, thus ensuring that a large proportion of the hydrocarbons is stored in the adsorber until the light-off temperature is reached at the catalytic converter. Moreover, the light-off temperature at the catalytic converter should be reached as early as possible, thus ensuring that the hydrocarbons are stored only for a short time and that effective conversion can then be achieved in the catalytic converter. In constructing the exhaust gas treatment devices, namely the adsorber and the catalytic converter, it must be taken into account that enlarging the volume of the adsorber leads to a corresponding increase in the amount of heat removed from the exhaust gas, with the result that the catalytic converter disposed downstream reaches the light-off temperature later.

Heretofore, the system including the adsorber and the catalytic converter has been over-dimensioned for a predetermined operating state for reasons of safety, thus incorporating deviations with regard to the actual temperatures which occur and/or the quality of the coatings, for example. However, in many cases that leads to an increase in the thermal mass in the exhaust gas system and hence to lengthening of the "cold starting phase," space problems, increased costs for the provision of the exhaust gas treatment devices and many other problems.

BRIEF SUMMARY OF THE INVENTION

It is accordingly an object of the invention to provide a method for operating an exhaust gas system, a method for operating a motor vehicle and a motor vehicle having the system, which overcome the hereinafore-mentioned disadvantages and at least partially solve the highlighted problems of the heretofore-known methods and vehicles of this general type. In particular, the intention is to specify a method for operating an exhaust gas system which ensures that as small as possible a quantity of unburned hydrocarbons flows into the environment through the exhaust line. In addition, such a system should be particularly amenable to adjustment with regard to pollutant levels and be capable of efficient operation for the entire service life or period of operation in a motor vehicle.

With the foregoing and other objects in view there is provided, in accordance with the invention, a method for operating an exhaust gas system of an internal combustion engine, which comprises providing the exhaust gas system with at least one adsorber for adsorbing hydrocarbons, a catalytic converter disposed downstream of the adsorber for converting hydrocarbons and at least one heating device disposed between the adsorber and the catalytic converter. The heating device is operated in a manner which is adapted in accordance with or in dependence on the state of aging of the catalytic converter.

In particular, this method is suitable for operating an exhaust gas system of a spark-ignition internal combustion engine. In exhaust gas systems of spark-ignition engines, the practice is, in particular, to employ three-way catalytic converters which convert the hydrocarbons, nitrogen oxides and carbon monoxides contained in the exhaust gas by oxidation. In this case, the light-off temperatures for catalytic converters in a new condition are about 220 to 260° C. The method is furthermore also suitable for operating an exhaust gas system of a diesel internal combustion engine. In this case, "diesel oxidation catalytic converters" (DOC) are employed, which are suitable for converting particulates, hydrocarbons and carbon monoxides. In this case, the light-off temperatures are about 130° C. in the new condition of the catalytic converter. However, the light-off temperatures of the three-way catalytic converters and of the DOCS shift toward higher temperatures as the catalytic converter ages.

In accordance with another mode of the method of the invention, the at least one heating device is operated in a manner adapted to the adsorption behavior or the desorption behavior of the at least one adsorber.

An adsorber for adsorbing hydrocarbons (HC) refers, in particular, to an exhaust gas treatment unit including a support structure and at least one adsorbing coating. An adsorber with a zeolite as a molecular sieve (coating) is preferably employed. Zeolites are microporous aluminosilicates (aluminum-silicon crystals) with the characteristic ability to adsorb certain molecules. The zeolite structure is formed of a tetrahedral lattice containing channels and/or cavities, the geometry of which distinguishes a zeolite. During the cold starting phase of driving operation, the hydrocarbons are adsorbed into the pore structure of the adsorber (adsorption phase). The strength of the attachment of the hydrocarbons to the adsorber depends on the type of hydrocarbon and the structure of the storage medium. With increasing time of operation and increasing exhaust gas temperature, the hydrocarbons stored in the adsorber are desorbed (desorption phase). This occurs at temperatures of from 100 to 200° C. It is furthermore preferred that the adsorber be disposed in a region of from 0 to 0.5 meters from the combustion chamber of the internal combustion engine and that it should provide a preferred support volume of 0.5 to 1 liter. In the case of placement close to the engine, in particular, the temperature stability of a zeolite coating must be taken into account. At high exhaust gas temperatures, in particular at temperatures above 800° C., this coating may be damaged. In particular, the adsorber is therefore disposed in a bypass, in particular a selectable bypass, of the exhaust line, with the result that the exhaust gas flows through the bypass only until a particular temperature is reached and no longer acts on the adsorber above the particular temperature. Moreover, the adsorber can, in particular, be disposed in the underbody area of a motor vehicle since in this case the temperature loading is lower than in the case of placement in the engine compartment. In this case, it is possible, in particular, to dispense with a bypass.

A catalytic converter for converting hydrocarbons refers, in particular, to an "oxidation catalytic converter" or, alternatively, to a diesel oxidation catalytic converter (DOC) or a three-way catalytic converter, i.e. a support or carrier body with a coating with an oxidizing action. The coating with an oxidizing action can include a substrate (such as a "washcoat") which is doped with noble metals and/or rare earths. In particular, platinum, rhodium, palladium and the like are employed in this case. It is furthermore preferred that the catalytic converter should be disposed in a region of 0 to 0.2 meters from the adsorber.

In particular, the at least one heater or heating device includes an electric heating element that can be regulated. In this case, the heating device preferably allows the exhaust gas to flow through and is suitable for increasing the temperature of the exhaust gas as it flows through. As a very particularly preferred option, the heating device includes a honeycomb body, in particular one which is constructed with metal sheets or foils.

Placing the at least one heating device "between" the adsorber and the catalytic converter also means that the heating device is integrated at least partially into the adsorber and/or catalytic converter and/or is disposed directly adjacent thereto. As a particularly preferred option in this case, the heating device and the catalytic converter form a structural unit in which an appropriate catalytic coating for converting hydrocarbons is applied directly to the heatable heating device, so that the catalytic coating is heated directly to correspondingly desired temperatures by activating the heating device.

In order to operate the at least one heater or heating device, the device is as a rule connected to a corresponding power supply/voltage supply and to a controller. In this way, it is possible to bring about activation or deactivation of the at least one heating device at predetermined points in time and/or parameters by using the controller. How this control or operation takes place is the subject matter of the present invention, and the following aspects, in particular, are important.

Accordingly, the heating device should be operated in a manner adapted in accordance with or in dependence on the state of aging of the catalytic converter. In other words, this means, inter alia, that the heat output provided is matched to, adjusted to and/or set up for the current state of aging of the catalytic converter. This means, in particular, that the current conversion capacity of the catalytic converter is determined or obtained and taken into account during the operation of the heating device. In particular, this includes operating processes which result in a mode of operation that varies (exclusively) in accordance with the state of aging of the catalytic converter over the service life of the exhaust gas system. In this case, the state of aging of the catalytic converter can be distinguished by the following factors, in particular:

thermal aging:
in this case, there is a reduction in the catalytically active surface area over the service life, due to the thermal loading of the catalytic converter, in particular due to sintering processes at temperatures above 800° C. and/or melting.

chemical poisoning:
chemical reactions with foreign substances (fuel, oil additives, etc.) can likewise destroy the catalytically active coating.

mechanical contamination:
during the service life of the catalytic converter, the catalytically active coating may also become increasingly covered, e.g. by lead, sulfur, phosphorus, manganese, etc. or by fuel and/or oil.

In particular, the state of aging of the catalytic converter can be determined from the hours of operation of the catalytic converter or of the motor vehicle. Moreover, the state of aging can be obtained from the period of time since the manufacture of the catalytic converter and/or since the installation thereof in an exhaust gas system. Further parameters which can play a part in the determination of the state of aging are: the type of catalytic charge, the type of coating, the thickness of the coating, the number of regeneration cycles during operation, the maximum temperatures reached, the average temperature (or temperature histogram), the quantity of exhaust gas which has flowed through, the type of exhaust gas, the type of fuel, if appropriate the combination of different types of fuel (additions of bioethanol, etc.), oil consumption, etc. A combination (with different weightings) of these parameters for determination and/or weighting of the state of aging is also possible.

In accordance with a further mode of the method of the invention, the heating device is operated at least in accordance with a predetermined limiting temperature of the catalytic converter, and the predetermined limiting temperature varies in accordance with a current age of the catalytic converter.

In the case of a fresh catalytic converter, the light-off temperature is lower than in a catalytic converter which has already aged. This can lead to the light-off temperature of a fresh catalytic converter being in such a low temperature range that it is already ready for operation before desorption of the unburned hydrocarbons from the adsorber disposed upstream has begun. In this case, therefore, supplementary heating of the exhaust gas system is not absolutely necessary for this scenario, for example. Due to the increasing aging of the catalytic converter, however, the light-off temperature and/or the effectiveness of conversion of the catalytic converter is shifted toward higher temperatures, with the result that, with a large number of system operating hours and hence over the service life of the system, desorption of unburned hydrocarbons from the adsorber starts before the catalytic converter disposed downstream has even reached the light-off temperature. Heat should then be supplied in accordance with this actual situation.

For this reason, operation of the heating device in a manner adapted to a predetermined limiting temperature of the catalytic converter is proposed herein. In this case, that limiting temperature is not constant over the service life or operating duration of the exhaust gas system but is variable. It depends on the current age or state of aging of the catalytic converter. In the (preferred) case, where the limiting temperature (approximately) represents the light-off temperature of the catalytic converter, the predetermined limiting temperature of the catalytic converter consequently rises overall in this period of time, as a rule. This can take place continuously and/or in steps. If required, the limiting temperature can be lowered again after cleaning or decontamination of the catalytic converter.

It is also advantageous in this regard if the age-dependent limiting temperature at which the catalytic converter reaches the light-off temperature is known at all times during the operation of the internal combustion engine. This limiting temperature accordingly varies in accordance with or in dependence on the current age or state of aging of the catalytic converter. Consequently, the heating device is switched on correspondingly earlier or for a longer time as the age of the catalytic converter increases in order to bring the catalytic converter to a temperature above or equal to the limiting temperature as far as possible (precisely) at this time. In particular, it should be taken into account in this case that it is not necessary for the entire catalytic converter surface area disposed downstream to be heated to the limiting temperature by the electric heating device but that it is, in particular, sufficient to heat just a small partial area in such a way that the limiting temperature is achieved locally. The catalytic conversion of the unburned hydrocarbons, which then begins locally, liberates sufficient energy from the exothermic reaction of combustion of hydrocarbons that the entire catalytic converter heats up very quickly and, accordingly, a large quantity of desorbed hydrocarbons can be converted.

In accordance with an added mode of the invention, the method performs at least the following steps:
determining a conversion temperature of the catalytic converter,
comparing the conversion temperature with a predetermined limiting temperature,
operating the heating device if the conversion temperature falls below the predetermined temperature.

The conversion temperature denotes, in particular, the temperature of the catalytic converter at the time at which the adsorber disposed upstream begins to desorb hydrocarbons. In particular, determination of the conversion temperature of the catalytic converter takes place only when it can be assumed from the state of aging of the catalytic converter that the limiting temperature is already higher than the conversion temperature. Cyclical and/or continuous interrogation of the conversion temperature of the catalytic converter is also possible. In order to ensure reliable conversion of the desorbed hydrocarbons, the conversion temperature preferably corresponds to the temperature of the catalytic converter which the latter must reach at the time when desorbed hydrocarbons reach the catalytic converter (in fact with a delay). It is therefore not necessary to measure the conversion temperature at the catalytic converter and/or for the conversion temperature to coincide with temperatures measured at other points in the exhaust line. On the contrary, this conversion temperature can also be obtained by calculation, starting from the exhaust gas temperature and/or the temperature of the adsorber. Accordingly, the heating device for heating the catalytic converter is, in particular, operated only when the conversion temperature falls below the applicable limiting temperature, that is to say, for example, the light-off temperature of the catalytic converter is not reached.

In accordance with an additional advantageous mode of the method of the invention, the heating device is operated in a manner adapted in accordance with or in dependence on the state of aging of the at least one adsorber. This takes into account the fact that the adsorber, in particular, on one hand begins desorption of stored hydrocarbons above a particular temperature—one which varies in accordance with age however—but, on the other hand, the adsorption rate can differ, depending on the state of aging. In this case too, not only the parameters mentioned above in connection with the catalytic converter but also the following further parameters can be used to determine the state of aging of the adsorber (if appropriate in combination and with different weightings): type of coating, thickness of coating, basic material, heat capacity of the adsorber, type of fuel, fuel additives.

In accordance with yet another mode of the method of the invention, an adaptation of a heat output of the heating device is carried out by operating a different number of heating segments or through a different ON duration of the heating device. Of course, these measures can also be carried out in combination. By operating individual heating segments and/or heating partial areas of the catalytic converter (separately, in isolation), it is possible to achieve very rapid local heating of the catalytic converter, with little electric power being employed. The fact that the light-off temperature is achieved locally means that conversion of the unburned hydrocarbons takes place first there. Due to this exothermic reaction, however, adjacent regions of the catalytic converter heat up so quickly that it is possible to dispense with supplementary electric heating.

With the objects of the invention in view, there is also provided a method for operating a motor vehicle, which comprises not employing the method according to the invention in a first operating phase of a motor vehicle but only when the predetermined limiting temperature reaches a particular value. This means, in particular, that it can be assumed that supplementary heating of the catalytic converter is not required before a particular limiting temperature is reached or before a certain state of aging of the catalytic converter is reached because, as a rule, the catalytic converter reaches the light-off temperature before desorption of the hydrocarbons from the adsorber disposed upstream begins. Accordingly, unnecessary determination of the conversion temperature of the catalytic converter is avoided, and hence the controller of the motor vehicle is relieved of such unnecessary interrogations. In this case, the initial operating phase can be characterized, in particular, by using at least one of the following parameters:
kilometers or miles traveled by the motor vehicle, in particular 20,000 kilometers or 12,000 miles,
operating time of the motor vehicle, in particular 100 hours.

With the objects of the invention in view, there is concomitantly provided a motor vehicle comprising an internal combustion engine, an exhaust gas system and a controller, the exhaust gas system having at least one adsorber for adsorbing hydrocarbons and a catalytic converter, disposed downstream of the adsorber. At least one heating device is disposed between the adsorber and the catalytic converter. The controller is set up or configured or programmed for carrying out the method according to the invention.

Other features which are considered as characteristic for the invention are set forth in the appended claims, noting that the features presented individually in the claims can be combined in any technologically meaningful way and give rise to additional embodiments of the invention.

Although the invention is illustrated and described herein as embodied in a method for operating an exhaust gas system, a method for operating a motor vehicle and a motor vehicle having the system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF SUMMARY OF THE INVENTION

Figure 1:
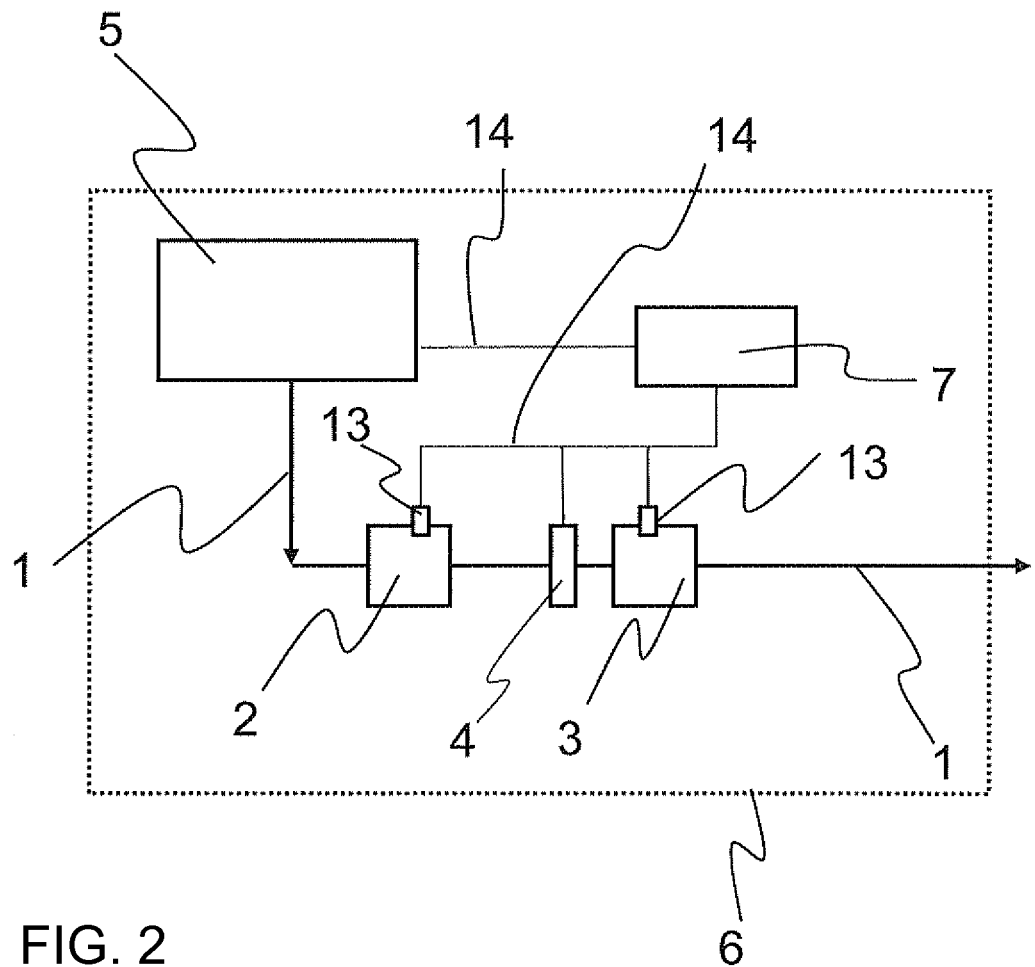
FIG. 1 is a block diagram of a motor vehicle having an exhaust gas system.

Referring now in detail to the figures of the drawings which show particularly preferred embodiments to which the invention is not restricted and first, particularly, to FIG. 1 thereof, there is seen a block diagram illustrating components that are preferably provided for carrying out the method according to the invention. In this case, a motor vehicle 6 includes an internal combustion engine 5 having an exhaust gas system 1. An adsorber 2, a heater or heating device 4 and a catalytic converter 3 are provided in the exhaust gas system 1. The adsorber 2 and the catalytic converter 3 are assigned sensors 13 which are suitable, for example, for determining respectively prevailing temperatures of the adsorber 2 and of the catalytic converter 3. The sensors 13 are connected to a controller 7 by control lines 14. The control lines 14 can be used, on one hand, to transmit sensor values that are determined and also, on the other hand, for supplementary electric heating of the heating device 4. The controller 7 is furthermore connected to the internal combustion engine 5 by control lines 14, allowing the controller 7 to obtain information about operating states of the internal combustion engine 5. In addition, the controller can be constructed with at least one memory element or can have access thereto so that, for example, characteristic maps, empirical values, parameter limiting values and the like can be called up and/or adapted.

Figure 2:
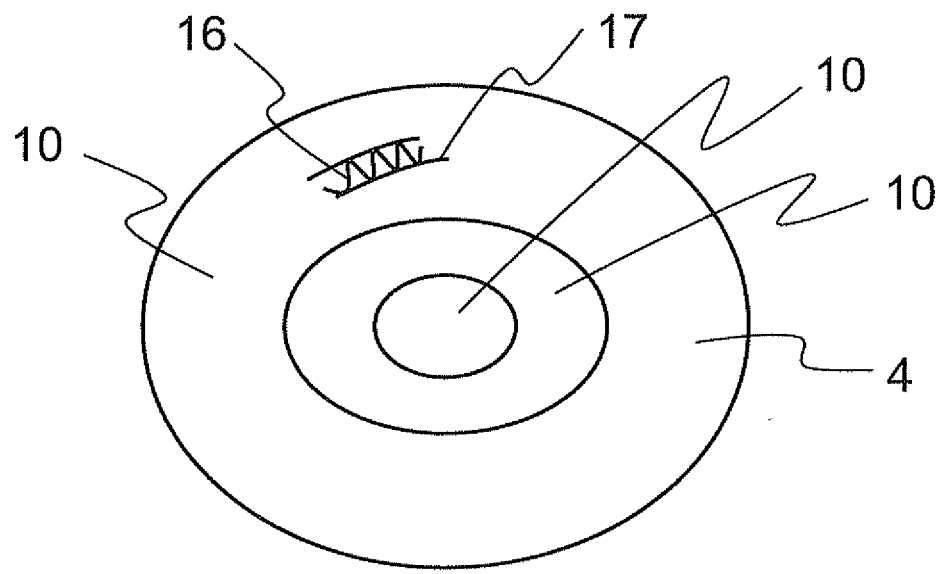
FIG. 2 is a diagrammatic, partly cross-sectional, plan view of a heating device.

FIG. 2 shows a variant embodiment of a heater or heating device 4 in the form of a honeycomb body shown partly in cross section, in which various annular heating segments 10 are disposed. The heating device 4 has smooth metal foils 17 and structured metal foils 16, which are stacked and/or coiled and/or wound one upon the other to form the heating device 4. For this purpose, the structured foils 16 and smooth foils 17 are connected to one or more non-illustrated electrodes, allowing the heating device 4 to be operated as a resistance heater, for example.

Figure 3:
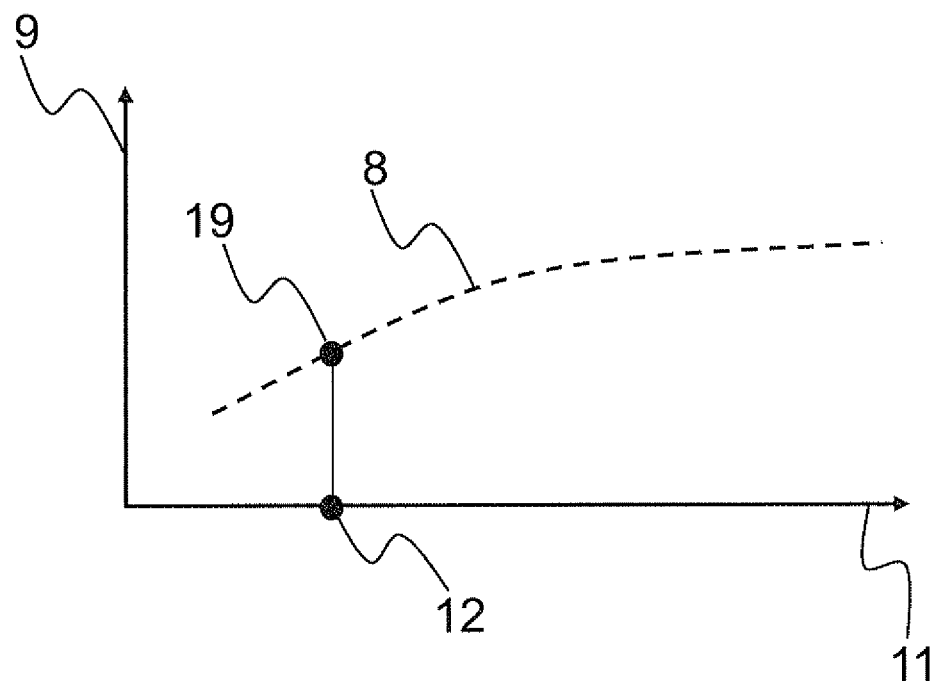
FIG. 3 is a diagram showing a possible change in a limiting temperature of a catalytic converter in accordance with the age thereof.

FIG. 3 shows a potential curve for a limiting temperature 8 plotted over a period of operation or service life of the catalytic converter in the exhaust gas system in accordance with or in dependence on the age 11 of the catalytic converter 3. The temperature 9 is plotted on the vertical axis, and the age 11 of the catalytic converter is plotted on the horizontal axis. FIG. 3 shows that, as the age 11 of the catalytic converter increases, the limiting temperature 8 is also shifted toward higher temperature values. At a particular point in time 12, a state of aging of the catalytic converter in which a particular limiting temperature 8 with a value 19 can be detected is accordingly reached.

Figure 4:
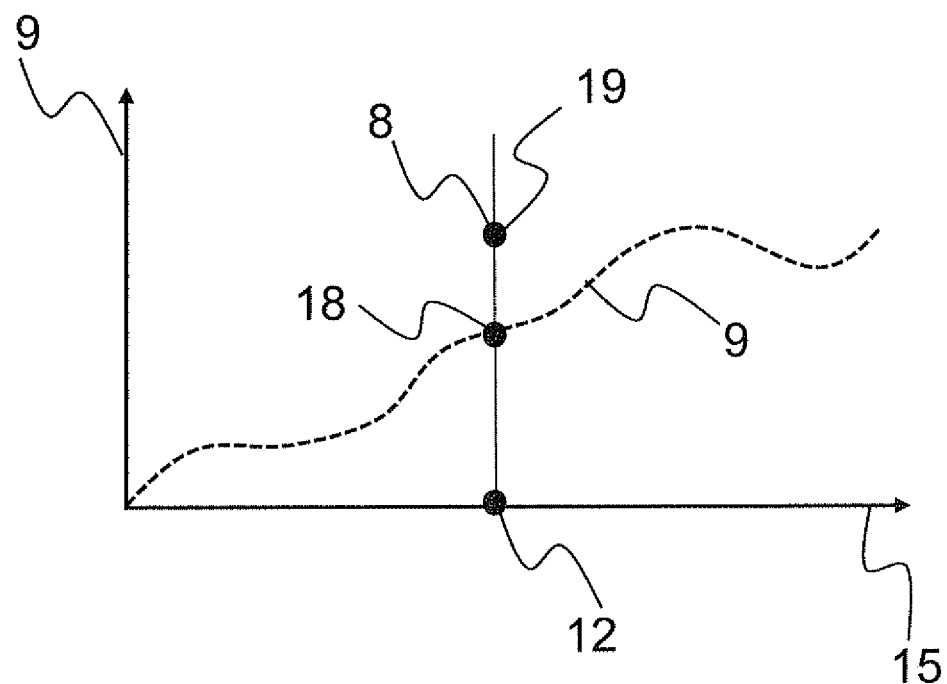
FIG. 4 is a diagram showing an operating state of an internal combustion engine.

FIG. 4 shows an operating state of the internal combustion engine 5, in which the time 15 is plotted on the horizontal axis and the temperature 9 is plotted on the vertical axis. In this case, the temperature 9 is, in particular, the respective current temperature detected in the catalytic converter by a temperature sensor 13. At a particular point in time 12, the temperature 9 determined for the catalytic converter corresponds to a conversion temperature 18 at which catalytic conversion of hydrocarbons by the catalytic converter must take place because those hydrocarbons are being desorbed and have reached the catalytic converter. At this point in time 12, the limiting temperature 8 has a value 19 and, according to FIG. 4, is above the currently determined temperature 9 or conversion temperature 18. This means that supplementary heating by the heater or heating device is required to heat the catalytic converter to an appropriate limiting temperature to enable the unburned hydrocarbons to be converted in the catalytic converter.

The present invention with all its variants solves the problems explained with reference to the prior art. In particular, a method for operating an exhaust gas system is indicated which ensures that as small as possible a quantity of unburned hydrocarbons flows into the environment through the exhaust line. Moreover, the system proposed can be adjusted particularly effectively and operated efficiently with regard to the pollutant levels over the entire service life or operating time in a motor vehicle. This provides cost advantages, in particular, and allows virtually complete conversion of the hydrocarbons over the entire period of operation of the exhaust gas system, with little outlay of energy.

The invention claimed is:

1. A method for operating an exhaust gas system of an internal combustion engine, the method comprising the following steps:

providing the exhaust gas system with at least one adsorber for adsorbing hydrocarbons, a catalytic converter disposed downstream of the at least one adsorber for converting hydrocarbons and at least one heater disposed between the at least one adsorber and the catalytic converter;

heating exhaust gas between the adsorber and the catalytic convertor with the at least one heater; and adjusting a heat output of the at least one heater in dependence on a state of aging of the catalytic converter.

2. The method according to claim 1, which further comprises adapting the operation of the at least one heater to an adsorption behavior or a desorption behavior of the at least one adsorber.

3. The method according to claim 1, which further comprises operating the at least one heater at least in dependence on a predetermined limiting temperature of the catalytic converter, and varying the predetermined limiting temperature in dependence on a current age of the catalytic converter.

4. The method according to claim 3, which further comprises:
determining a conversion temperature of the catalytic converter;
comparing the conversion temperature with the predetermined limiting temperature; and
operating the at least one heater if the conversion temperature falls below the predetermined temperature.

5. The method according to claim 1, which further comprises adapting the operation of the at least one heater in dependence on a state of aging of the at least one adsorber.

6. The method according to claim 1, which further comprises adapting a heat output of the at least one heater by operating a varying number of heating segments of the at least one heater or by varying an ON time of the at least one heater.

7. A method for operating a motor vehicle, the method comprising the following steps:
carrying out the steps according to claim 3 in a first operating phase of the motor vehicle but only when the predetermined limiting temperature reaches a particular value.

8. A method for operating a motor vehicle, the method comprising the following steps:
carrying out the steps according to claim 4 in a first operating phase of the motor vehicle but only when the predetermined limiting temperature reaches a particular value.

9. A method for operating a motor vehicle, the method comprising the following steps:
carrying out the steps according to claim 5 in a first operating phase of the motor vehicle but only when a predetermined limiting temperature reaches a particular value.

10. A method for operating a motor vehicle, the method comprising the following steps:
carrying out the steps according to claim 6 in a first operating phase of the motor vehicle but only when a predetermined limiting temperature reaches a particular value.

11. A motor vehicle, comprising:
an internal combustion engine;
an exhaust gas system associated with said internal combustion engine, said exhaust gas system having at least one adsorber for adsorbing hydrocarbons, a catalytic converter disposed downstream of said at least one adsorber for converting hydrocarbons and at least one heater disposed between said at least one adsorber and said catalytic converter; and
a controller connected to said at least one heater and configured to adjust a heat output of said at least one heater in dependence on a state of aging of said catalytic converter.

12. The method according to claim 1, wherein the state of aging of the catalytic convertor is determined in dependence of a limiting temperature of the catalytic converter plotted over a period of operation or service life of the catalytic converter in the exhaust gas system.

13. The method according to claim 12, wherein an aging of the catalytic convertor is determined in dependence of a shifting of the limiting temperature towards higher temperature values.

14. The method according to claim 1, wherein an aging of the catalytic convertor is determined in dependence of a shifting of the limiting temperature towards higher temperature values.

15. The method according to claim 1, wherein an aging of the catalytic convertor is determined from the hours of operation of the catalytic convertor.

16. The method according to claim 1, wherein an aging of the catalytic convertor is determined from the hours of operation of the internal combustion engine.

17. The method according to claim 1, wherein an aging of the catalytic convertor is determined from period of time since the manufacture of the catalytic convertor.

18. The method according to claim 1, wherein an aging of the catalytic convertor is determined from period of time since the installation of the catalytic convertor in the exhaust gas system.

19. The method according to claim 1, wherein at least one of the following parameters are considered in the determination of the aging:
a type of coating of the catalytic converter;
a thickness of the coating of the catalytic converter;
a number of regeneration cycles during operation of the catalytic converter;
a maximum temperature reached during operation of the catalytic converter;
an average temperature during operation of the catalytic converter;
a quantity of exhaust gas which has flown through the catalytic converter;
a type of exhaust gas which has flown through the catalytic converter;
a type of fuel which was consumed by the internal combustion engine; and
an oil consumption of the internal combustion engine.

20. A method for operating an exhaust gas system of an internal combustion engine, the method comprising the following steps:
providing the exhaust gas system with at least one adsorber for adsorbing hydrocarbons, a catalytic converter disposed downstream of the at least one adsorber for converting hydrocarbons and at least one heater disposed between the at least one adsorber and the catalytic converter;
determining a current conversion capacity of the catalytic convertor;
determining a current state of ageing of the catalytic convertor based on the current conversion capacity of the catalytic convertor;
heating exhaust gas between the adsorber and the catalytic convertor with the at least one heater; and
adjusting a heat output of the at least one heater in dependence on the current state of aging of the catalytic converter.

* * * * *